Feb. 15, 1927.

L. P. ERB 1,617,380

VARIABLE TRANSMISSION

Filed July 14, 1919

WITNESSES

Howard D. Orr.

F. T. Chapman.

Lanious P. Erb, INVENTOR,

BY

ATTORNEY

Feb. 15, 1927.
L. P. ERB
VARIABLE TRANSMISSION
Filed July 14, 1919

WITNESSES
Howard D. Orr
F. T. Chapman

Lanious P. Erb, INVENTOR,
BY E. G. Siggers
ATTORNEY

Feb. 15, 1927.
L. P. ERB
1,617,380
VARIABLE TRANSMISSION
Filed July 14, 1919
5 Sheets-Sheet 5

WITNESSES
Howard D. Orr.
F. T. Chapman.

Lanious P. Erb, INVENTOR,
BY E. G. Siggers
ATTORNEY

Patented Feb. 15, 1927.

1,617,380

UNITED STATES PATENT OFFICE.

LANIOUS P. ERB, OF ANACONDA, MONTANA, ASSIGNOR OF ONE-FOURTH TO WALTER M. C. SMITH, OF SEATTLE, WASHINGTON, AND ONE-FOURTH TO HERSEY J. ALLEN, OF ANACONDA, MONTANA.

VARIABLE TRANSMISSION.

Application filed July 14, 1919. Serial No. 310,785.

This invention has reference to variable transmission means particularly intended for use in connection with automobiles but capable of use with other structures, and its object is to provide a structure using a fluid for transmitting power in place of gearing customarily used so that a range of control is obtained materially beyond the range permitted by gearing, and the mechanism to be driven may be further controlled as by a brake.

In the ordinary types of gear transmission certain forward and reverse movements are provided for but these movements are few and fixed, there being in an automobile two or three and occasionally four forward speeds and one and occasionally two reverse speeds, but few have provisions made for braking the automobile by the transmission, especially for emergency purposes, such braking being left to the mechanical brake system of the automobile.

In accordance with the invention there is provided a structure which may be substituted for and is of about the same size as the usual variable speed transmission mechanism of the automobile, so that, aside from the substitution of the invention for the speed changing gearing ordinarily present, there is no material change to be made in such substitution, wherefore the invention may be readily applied to existing automobiles and no marked change is required to adapt the invention to new automobiles.

The invention comprises a pump and a motor which may be enclosed in a casing of small compass, the pump being connected to the power unit of the vehicle and the motor being connected to the driven part of the vehicle while the pump and motor are connected together by a fluid circulating between them and transmitting the power of the engine to the drive wheels of the automobile. In connection with the transmission there is provided a readily controllable valve by means of which the course of the fluid through the transmission is controlled for forward or reverse driving, and another valve is provided for braking purposes, or for other control, which latter control may be in conjunction with the first-named valve and one or both valves may be used for the control of speed and power to extents far in excess of the control provided by ordinary gear variable speed transmission.

The invention is not confined to the use of any particular fluid, since the fluid employed may be liquid or gaseous, or a mixture thereof. Of the various fluids which may be employed oil presents numerous advantages and in the following description will be considered as the fluid used, without, however, confining the invention to such particular fluid. Under some circumstances air may be employed, or gas may be used, or a mixture of liquid and air or gas. These various substances are mentioned to show the wide range of transmission fluids available.

The invention will be best understood from a consideration of the following detailed description taken in connection with the accompanying drawings forming part of this specification, with the understanding, however, that the invention is not confined to any strict conformity with the showing of the drawings, but may be changed and modified so long as such changes and modifications mark no material departure from the salient features of the invention as expressed in the appended claims.

Referring to the drawings, there is shown a casing composed of two sections A, B, the section A enclosing pump mechanism and the section B enclosing motor mechanism set in motion by the pump mechanism. The section A comprises a chambered member 1 enclosing a chamber 2, and other connected chambers 3, 4, respectively, united at a contracted interior portion or neck 5. The chambers 3 and 4 are of cylindrical conformation, the chamber 3 containing a rotor 6 and the chamber 4 containing a similar rotor 7. Each rotor has diametrically opposite enlargements or blades 8 circumferentially extended into segmental form with each blade meshing with the other rotor between the blades thereof. The chambers 3 and 4 are closed on one face by a wall or web 9 and on the opposite face by a division plate 10 and each rotor 6 and 7 is mounted on a respective shaft 11, 12, the arrangement being that of a rotary pump. The shafts 11 and 12 are each journaled at one end in respective bearings 13 and 14, while the other end of the shaft is passed through the wall 10 into a chamber 15 formed in an outside wall 16 applied against the plate 10 on the side thereof remote from the chambers 3 and 4. In the chamber 15 formed by the outside wall 16 the shafts 11 and 12 carry gear wheels 17 and 18 respectively, the gear wheels intermeshing, and beyond the gear wheels the respective shafts have journal bearings 19 supporting them. The gear wheels serve as timing gears for the rotors.

One of the shafts, say the shaft 12, is continued through the journal bearing 14 and through a stuffing box 20 and beyond the latter is squared, as shown at 21, or is otherwise formed to be coupled to the power unit of the automobile, it being considered, for sake of simplicity of description, that the fluid transmission structure is intended for an automobile, without, however, limitation to such particular use. The arrangement is such that when the power unit is in operation the shaft 12 is rotated, carrying with it both the rotor 7 and the gear wheel 18, causing a similar movement of the gear wheel 17, shaft 11 and rotor 6.

The casing section B is generally similar to the casing section A and is similarly equipped. The section B comprises a wall 22 similar to the wall 9 but omitting any chamber corresponding to the chamber or reservoir 2. Like the section A, the section B includes a division plate 23 similar to the division plate 10 and a wall 24 similar to the wall 16. Between the wall 22 and division plate 23 there are formed communicating cylindrical chambers 25, 26 respectively, containing rotors 27, 28, each with diametrically opposite blades 29, like the rotors 6 and 7 of the pump, their blades 29 intermeshing after the manner of a rotary pump. The rotors 27 and 28 are carried by respective shafts 30, 31. The shaft 30 is carried in a journal bearing 38 mounted in a hollow boss 33 projecting from the wall 22 and also in a journal bearing 36 in a hollow boss 37 carried by the wall 24. The shaft 31 is carried at one end in a journal bearing 34 within a hollow boss 35 projecting from the wall 24, while at the other end the shaft 31 extends through a bearing 38 projecting from the wall 22 and carrying a packing gland structure 39 beyond which the shaft is prolonged and terminates in a squared or other suitably shaped end 40 for attachment to the rear or driving wheel assembly of the automobile, or in the case of other mechanisms, for attachment to the parts to be driven. The shafts 30 and 31 carry intermeshing timing gear wheels 17$^a$ and 18$^a$ like the gear wheels 17 and 18 and for a similar purpose, that is to connect and properly time the respective rotors 27 and 28 in the same manner as the rotors 6 and 7 are connected and timed by the gear wheels 17 and 18.

Figure 3:
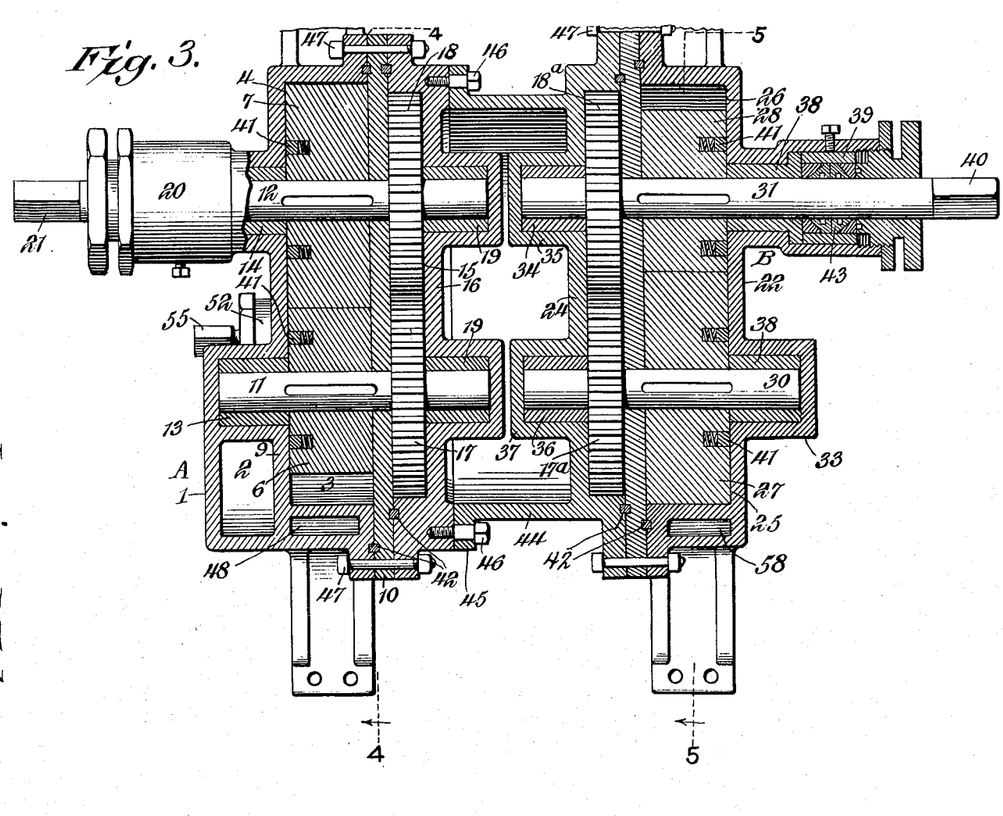
Figure 3 is a section on the line 3—3 of Figure 2, with some parts in elevation.

The rotors 6 and 7 and 27 and 28 are provided with packing rings 41 which may be spring-pressed or otherwise arranged for the purpose. At other points where there is liable to be leakage, soft metal strips 42 may be provided. Moreover, where the shafts 12 and 31 project through the packing glands provided for them to the exterior of the transmission structure, suitable packing, indicated generally at 43 in Figure 3, may be employed, so that leakage may be prevented. The division plate of the pump casing and the division plate 23 of the motor casing form, with the respective walls 16 and 24, a sealed chamber in which are enclosed the timing gears, whereby only a small amount of the oil in the transmission mechanism is permitted to escape to the gears for lubricating the gears. By these separate chambers for the gears, the oil used for transmission purposes is not churned into a fine spray, as would be the case were the gears revolving in a quantity of the transmission oil.

In order to rigidly connect the pump and motor structures in close association so that the whole structure may occupy a minimum amount of space to permit it to be substituted for the usual transmission gear in an automobile, or to occupy the same space that is usually occupied by the transmission gear, the wall 24 is provided with an integral and preferably cylindrical web 44 suitably flanged at one end as indicated at 45, for attachment by means of cap screws 46 to the wall 16, the two walls 16 and 24 housing the two pairs of timing gears 17, 18 and 17$^a$, 18$^a$. In order to facilitate the assemblage of the parts the casing elements of the members A and B are joined by bolts 47 firmly uniting them.

The whole web structure occupies but a minimum space axially, whereby the transmission structure, with its rotors, timing gears, ducts and other parts, may be readily substituted for existing transmission gearing of standard form without change in size, thus greatly simplifying the whole structure and permitting the use of a fluid transmission in existing automobiles, so that there is no necessity of re-designing and rebuilding automobiles in order to permit the change from gear transmission to fluid transmission.

The wall 24 and the integrally formed cylindrical web 44 are removable and may be replaced by a wall provided with a longer web, whenever the length of the ordinary transmission to be replaced is such that it will require a longer fluid transmission. In such case, a wall having a longer web is substituted for the wall with the shorter web, whereby it will be unnecessary to lengthen the drive shaft, or the driven shaft, to complete the connection between said shafts. The motors and the pumps with their respective casings may be built of standard size, so that it will only be necessary to substitute a wall provided with a longer web and to provide a valve having correspondingly longer ducts in adapting the fluid transmission to various types of automobiles.

The web 44, besides its other functions, provides an auxiliary protective means to prevent foreign matter from the roadbed entering the pump or rotor, or getting into the bearings of the shafts.

Opening at one end into the chamber 3 at the bottom portion thereof where it merges into the chamber 4 is a duct 48 encircling the chamber 3 and continued above the casing member A and terminating at a flange 49 through which the duct opens. Rising from the neck 5 is another duct 50 opening through the flange 49 alongside of the duct 48. The duct 48 communicates with the reservoir 2 through a port 51 spaced for a distance away from the end of the duct 48 opening into the chamber 3. Between the port 51 and the end of the duct opening into the chamber 3 there is provided an enlargement 52, best shown in Figures 7 and 8 and also appearing in others of the figures, and this enlargement is shaped to house a rotatable valve 53 having a cutaway portion 54 on one side conforming to the duct 48, the arrangement being such that the valve 53 may be rotated to close the duct 48 or to open it to its full size as desired. The valve 53 is provided with a stem 55 for the application of a suitable connection which may be carried into position to be readily manipulated by the operator of the vehicle, since in the operation of an automobile the valve 53 must be under the control of the operator at all times, permitting the operator to manipulate the valve while controlling the running of the vehicle.

The flange 49 is situated on one side of the center of the casing as a whole and a similar flange 56 is located on the other side of the casing, the two flanges facing. The flange 56 is traversed by a duct 58 encircling the chamber 25 and entering said chamber at the lower part thereof. The flange 56 is also traversed by another duct 57 entering the chamber 26 at a high point therein about over the lower end of the duct 58, the arrangement being similar to that of the pump structure.

Figure 1:
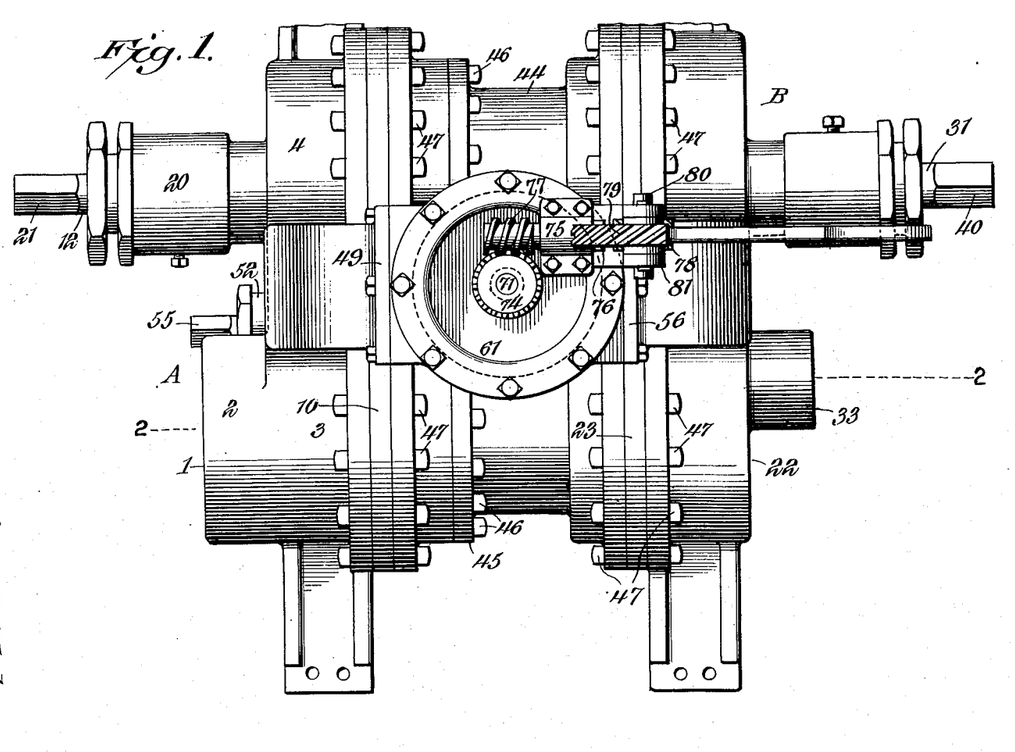
Figure 1 is a plan view of the variable speed transmission structure.
Figure 2:
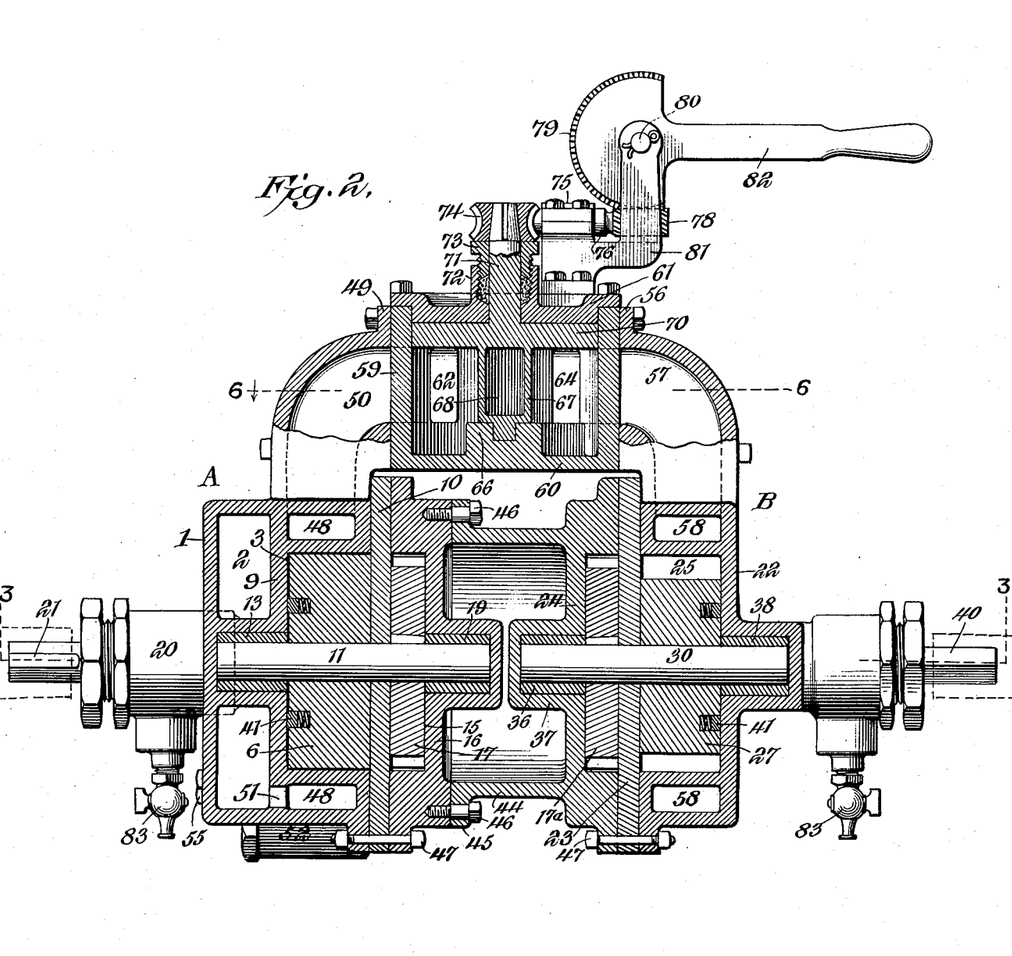
Figure 2 is a section partly on the line 2—2 of Figure 1 showing parts in elevation.
Figure 6:
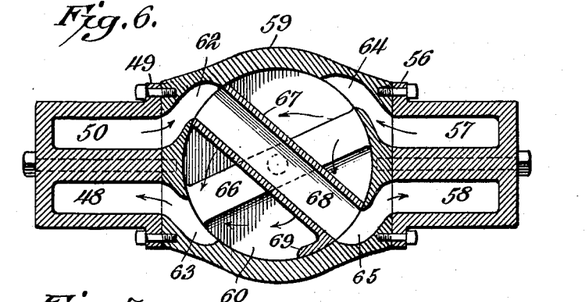
Figure 6 is a section on the line 6—6 of Figure 2, showing the main control valve.

Extending between the flanges 49 and 56 is a valve structure, shown in detail in Figures 2 and 6 and in plan view in Figure 1. The valve structure comprises a casing 59 which also serves to rigidly connect the pump and rotary motor structures together at the top and may be of cylindrical contour, having a closed bottom 60 and a removable top 61 held in place by bolts or screws. The valve casing has opposite flat sides pierced by ports 62, 63, 64 and 65 matching the ducts 48 and 50 at one end of the valve and the ducts 57 and 58 at the other end of the valve. Extending across the interior of the valve and rising above the bottom 60 is a ledge 66 on which is journaled a hollow bar 67 having a duct 68 extending therethrough from end to end and at one end provided with a laterally extended lip 69. The ends of the bar 67 and the lip 69 as well as the interior of the valve casing 59 are machined to make a smooth close fit. The bar 67 forms a part of or is secured to a disk-shaped valve head 70 of a diameter equal to that of the bore of the valve casing 59. The head 70 is provided with a stem 71 extending through and journaled in a boss 72 in the head 61. The boss 72 carries a packing gland 73 whereby a fluid tight joint is provided and permitting the turning of the movable member of the valve as needed. The stem projects above the gland 73 and there carries a worm wheel 74 while the head 61 has fast thereto a journal bearing 75 in which is journaled a shaft 76 with a worm thread 77 engaging the worm wheel 74. The end of the shaft 76 remote from the worm thread 77 also has worm threads 78 adapted to be engaged by a worm segment 79 mounted on a pintle 80 carried by a bracket 81 which may in turn carry the journal bearing 75. The worm segment 79 is provided with a manipulating device 82 which may be a handle or treadle suitably shaped and so disposed as to be within the reach of the driver of the vehicle, say in the same position that the usual gear-shifting levers or treadles are situated. The operating handle 82 is adapted to be locked against movement in any one of a plurality of different positions by the worm segment 79 intermeshing with the worm 78. The locking of the handle 82 likewise locks the valve 67 in position and thereby prevents shifting of the valve after it has once been set. The locking of the handle is due to the fact that while the gear segment 79 may operate the worm 78, said worm locks with the gear segment and will not operate said gear segment.

The shafts 12 and 31 where extending through packing glands often, despite careful adjustment and because of wear, leak oil. To prevent accumulations of oil from soiling adjacent parts, each packing gland mechanism is provided with a pet-cock 83, of usual construction, for draining.

In using the fluid transmission structure it may be assumed that a sufficient amount of fluid is present therein to fill the ducts. If the fluid be a gas or a mixture of gas and liquid it may be found desirable to put it initially under compression. If the fluid be a liquid, of which oil may be taken as an example, there is of course no precompression. Considering the valve duct 68 as in the position shown in Figure 10 and the valve 53 so positioned as to in nowise interfere with the continuity of the duct 48, then when power is applied to the shaft 12 by means of the prime mover or power element of the automobile, the oil is caused to flow from the pump in the casing A through the duct 50 directly through the duct 57, to the rotors in the casing B, causing the latter to rotate and drive the shaft 31 in the forward direction, this, of course, depending upon the pinion which engages the differential gear being on the proper side. After doing its work the oil passes from the casing B by way of the duct 58 into the valve casing 59 and directly to the duct 48, ultimately flowing out through the other end of the duct 48 into the chambers 4 and 3, being propelled once more by the pump into the duct 50 to pursue the same course as just described. In this manner power is transmitted through the transmission mechanism, through the medium of the fluid employed, from the engine to the drive wheels, causing the latter to move in the forward direction.

The chamber 2 is made large enough to hold more oil than the cubical capacity of the pump. Therefore, the pump empties into the ducts while valve 53 is closed. In case the motor ceases motion at the instant the pump is empty, the ducts between the pump and motor and the motor and valve 53 would be full of oil and only the amount of oil emptied from the pump would enter the chamber. When the pump is filled after valve 53 is opened there still remains some oil in the chamber with air trapped above it, and at no time does this air back down through the port 51 into the system. When the valve 53 is only partly closed the oil is compelled to back up through the port 51 into the chamber. Various positions of the valve, from closed to open position will provide for various speeds of the automobile and with slight variation between the speeds. In other words, the more oil that is fed through the valve 53, the greater the speed that is obtained until it reaches the direct drive with the valve 53 fully open and the valve 67 in the position shown in Figure 10. The less oil, that is fed, the lower the speed. The valve 67 controls the feed of the oil to the motor, while the valve 53 controls the feed of the oil to the pump.

To cause the forward drive, the valve member 67 has the ends of the duct 68 therethrough blanked by the walls between the ports 62 and 63 on one end and the ports 64 and 65 on the other end, the spacing of the ports 64 and 65 being sufficient to accommodate both the corresponding end of the valve member 67 and its lip 69.

If it be desired to reverse the direction of rotation of the drive wheels for backing purposes then the valve member 67 is moved to the position shown in Figure 6, the duct 68 connecting the ports 62 and 65. Under such circumstances, the pump always rotating in one direction, the flow of fluid is by way of the duct 50, port 62, duct 68, port 65 and the duct 58 into the casing B, acting on the rotor in the reverse direction to that described with reference to the position of the valve member 67 shown in Figure 10. The return of the fluid is by way of the duct 57, port 64, casing 59, about the valve member 67, port 63 and duct 48.

Figures 7, 8, 9, 10, 11:
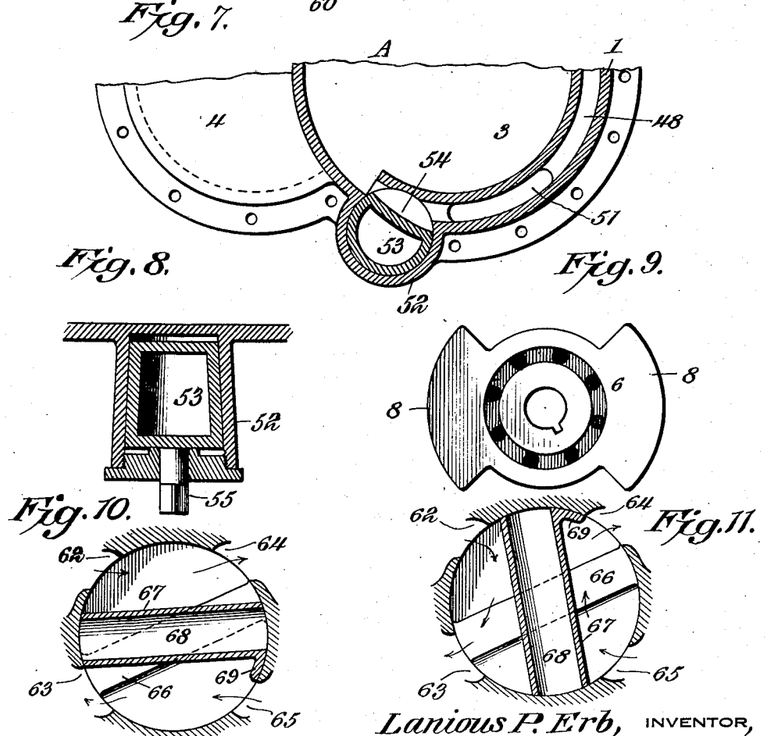
Figure 7 is a section through the brake valve and adjacent parts.
Figure 8 is a section through the brake valve in a plane at right angles to that of Figure 7.
Figure 9 is a face view of one of the rotary pistons of the pump of Figure 4 showing the face thereof remote from that seen in Figure 4.
Figures 10 and 11 are views showing different valve positions.

If it be desired to permit the vehicle to coast then the valve member 67 is placed in an intermediate position indicated in Figure 11. The fluid coming from the pump through the duct 50 is shunted directly to the duct 48, while the fluid in the casing B passes by way of the duct 58, port 65, casing 59, port 64 to the duct 57 and back to the casing B, permitting the drive wheels of the vehicle to rotate idly. If it be desired to retard or brake the movement of the vehicle in coasting it is only necessary to adjust the valve member 67 to bring the lip 69 into partial close relation to the port 65, thus interfering with the free flow of the fluid, with a consequent braking action.

Figure 4:
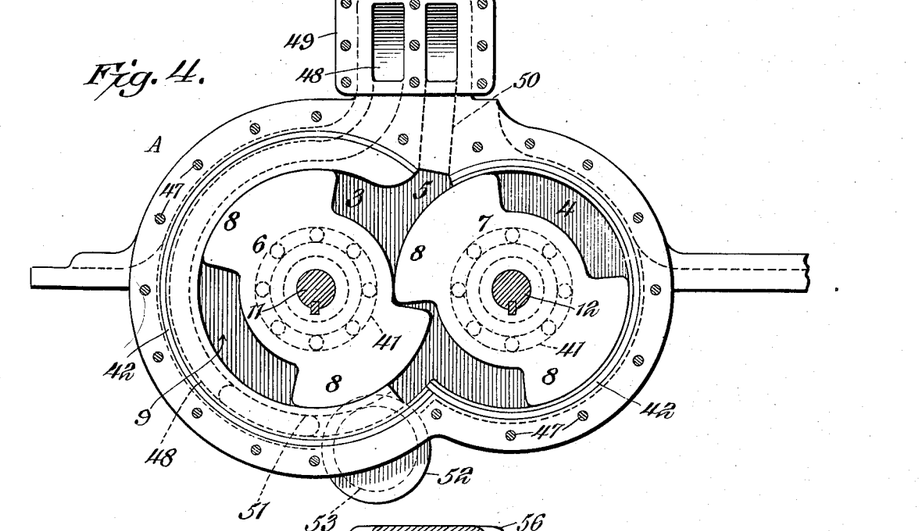
Figure 4 is a section on the line 4—4 of Figure 3.
Figure 5:
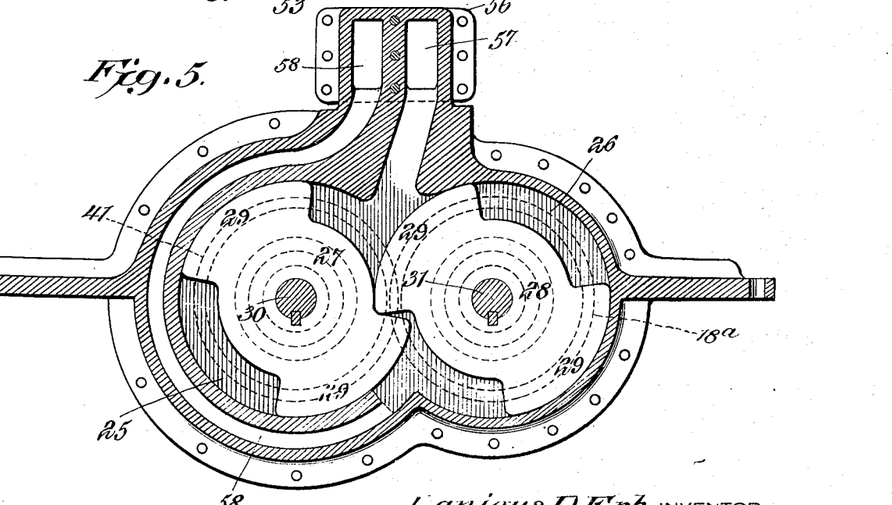
Figure 5 is a section on the line 5—5 of Figure 3.

In following the course of the fluid through the pump and motor, units respectively, fluid enters the pump from the motor by way of the duct 48, which encircles the chamber 3 in the showing of Figure 4. The rotors 6 and 7 coact to force this fluid through the neck 5 and toward the motor casing. The rotor 6, mounted on the shaft 12, is rotated directly by power received from the prime mover of the mechanism, and hence may be termed the primary rotor with the companion intermeshing rotor 6 serving as a secondary rotor coacting with the primary rotor. The fluid under the action of the pump, made up of the rotors 6 and 7 in the casing A, is forced through the valve casing 59 into the motor casing B in a direction depending upon the position of the reversing valve in the casing 59, thereby acting upon the rotors 27 and 28 in the casing B in a manner to rotate these rotors so as to drive the motor in one direction or the other, ultimately returning to the pump to receive a driving impulse from the rotors 6 and 7, as before.

The duct 48 encircles the portion of the casing A in which the rotor 6 rotates, for the greater part of its circumferential extent, while the duct 50 is short and is practically limited to the length of the neck 5.

What is claimed is:—

1. A variable speed transmission utilizing fluid as a power transmitting means, comprising a pump having intermeshing rotors, a motor having intermeshing rotors in close association with the pump and separated therefrom in the direction of the length of an automobile on which the transmission structure is mounted by a distance whereby the entire length of the transmission corresponds substantially to the length of a standard transmission gearing of an automobile, casings individual to the pump and rotor, a removable axially extended hollow web forming a part of one of the casings and made fast to the other casing, ducts connecting the casings for transmitting fluid from one casing to the other, and a valve external to said web for controlling the flow of fluid between the casings.

2. A variable speed transmission for automobiles utilizing fluid as the power transmitting means comprising a pump casing with intermeshing rotors therein, a motor casing with intermeshing rotors therein, the motor casing being in close association with the pump casing and displaced therefrom in the direction of the length of the automobile by a distance whereby the entire length of the transmission is substantially equal to the length of a standard transmission gearing, a removable axially extended hollow web having a closed end wall connected to said casings for binding them together, said casings having ducts for transmitting motive fluid from one casing to the other, and a valve in said ducts to change the course of flow through the ducts, the walls of the ducts in cooperation with the valve structure serving as a connection between the casings to bind them together in addition to the web.

3. A variable speed transmission utilizing fluid as a power transmitting means, comprising two closely associated casings, each with a pair of intermeshing rotors therein, and said rotors having their axes in parallel relation, a closed wall for each casing on that face toward the other casing, and a hollow web integral with one wall and extended to and removably secured to the other wall, whereby the pump and motor structures are rigidly connected together in close association longitudinally of the transmission structure, the combined web and wall being adapted to be replaced by webs of different lengths.

4. A variable speed transmission utilizing fluid as a power transmitting means, comprising two closely associated casings, each with a pair of intermeshing rotors therein, said rotors having their axes in parallel relation, a division plate on the inner side of each rotor and closing the chamber thereof, an outer wall for each casing spaced from the division plate and forming therewith a substantially sealed chamber, an open ended hollow web integral with one wall and extended laterally and removably secured to the other wall, whereby the two casings are rigidly connected together in close association in the longitudinal axis of the transmission structure, and timing gears for the rotors located within the sealed chambers.

5. A variable speed transmission utilizing fluid as a power transmitting means, comprising a pump, a drive shaft for the pump, intermeshing rotors in the pump, a driven structure having a drive shaft, rotors driven thereby, intermeshing timing gears on the several shafts, casings enclosing the rotors and each having a wall with hollow bosses for the corresponding ends of the shafts, a division plate between the timing gears and the rotors and an open-ended hollow web integral with one of the walls and connected to the other wall and enclosing the space between the casings, the timing gears being housed by the walls and the division plates, said web adapted to be removed and replaced by a web of different length.

6. In a fluid transmission device for motor vehicles and the like, the combination of a pump casing, a motor casing spaced from the pump casing, a hollow web removably secured to the adjacent ends of said casings, a transverse partition wall integral with one end of said hollow web, a pump within the pump casing, a motor within the motor casing, said partition wall having bearings for the shafts of said motor, and valved fluid connections between said pump and motor casings external to said web.

7. A variable speed transmission for automobiles, for utilizing a fluid as the power transmitting means, comprising a casing of dimensions to replace a standard variable speed gear transmission, and enclosing pairs of associated communicating chambers with ducts for connecting opposite sides of one pair of chambers with opposite sides of the other pair of chambers and the ducts being included in the casing, a pair of intermeshing rotors in each pair of associated communicating chambers, with each rotor provided with diametrically opposite circumferentially extended segmental blades entering between two similarly extended segmental blades of the other rotor, and a shaft for one rotor of each pair extending to the exterior of the casing for connection, one to the power unit of the automobile and the other to the driving shaft of the automobile.

8. A variable speed transmission for automobiles for utilizing a fluid as the power transmitting means, comprising a casing of dimensions to replace a standard variable speed gear transmission, pairs of associated communicating chambers enclosed by the casing, with ducts for connecting opposite sides of one pair of chambers with the opposite sides of the other pair of chambers, a pair of intermeshing rotors in each pair of associated communicating chambers, each rotor having diametrically opposite circumferentially extended segmental blades entering between two similarly extended segmental blades of the other rotors, a shaft for one rotor of each pair extending to the exterior of the casing structure for connection, one to the power unit of the automobile, and the other to the driving shaft of the automobile, and a valve included in ducts between the pairs of chambers with the valve arranged to connect the pairs of chambers for driving the vehicle forward, for reversing the vehicle, and for permitting coasting or drifting.

9. A variable speed transmission for automobiles, for utilizing a fluid as the power transmitting means, comprising a casing of dimensions to replace a standard variable speed gear transmission, and enclosing pairs of associated communicating chambers with ducts for connecting opposite sides of one pair of chambers with the opposite sides of the other pair of chambers, a pair of intermeshing rotors in each pair of associated communicating chambers, with each rotor provided with diametrically opposite circumferentially extended segmental blades entering between two similarly extended segmental blades of the other rotor, a shaft for one rotor of each pair extending to the exterior of the casing for connection, one to the power unit of the automobile and the other to the driving shaft of the automobile, and a valve included in the ducts between the pairs of chambers with the valve arranged to connect the pairs of chambers for driving the vehicle forward, for reversing the vehicle, and for permitting coasting or drifting, with the shafts extending from the pairs of the rotors to the exterior of the casing being parallel one with the other and extended lengthwise of the automobile and the pairs of rotors being arranged in planes parallel to each other and transverse of the length of the automobile.

10. Power transmitting means for utilizing a fluid as the power transmitting medium, comprising a casing with connected chambers therein, intermeshing rotors in the chambers, and ducts communicating with the chambers on opposite sides thereof, one duct being located within the wall of one chamber about the latter, another chamber connected to the last-named duct adjacent to that end of the latter entering the communicating chambers, and a valve for controlling the flow of fluid through the last-named duct and located between the last-named chamber and the end of the duct entering the communicating chambers, whereby fluid flowing through the duct toward the communicating chambers may be allowed to so flow or may be directed into the last-named chamber.

11. A variable speed transmission for utilizing a fluid as the power transmitting means, comprising two closely adjacent casings forming a casing structure, with each casing enclosing associated communicating chambers, ducts within the casings and communicating with the associated chambers at opposite sides thereof and having the other ends of the ducts provided with associated ports, intermeshing rotors in each casing, means for connecting one rotor in one casing with a power unit and one rotor in the other casing with a driven unit respectively, a valve between and connecting the associated ports of the ducts and adjustable to control the direction and amount of fluid flowing through the ducts, one of the casings being provided with a chamber with a port connecting the chamber to one of the ducts in the same casing, and a valve in the last-named duct for directing the flow of fluid through the duct or into or out of the chamber.

12. In an automobile, a variable speed transmission utilizing a fluid as the power transmitting means and comprising a casing structure with intermeshing rotors forming driving and driven means and having ducts connecting them, a valve between the driving and driven means for controlling the course of fluid with respect thereto, a reservoir for the fluid associated with the driving means and connected with one of the ducts, and a valve for directing the flow of fluid into and out of the reservoir.

13. A variable speed transmission structure for automobiles, in which structure fluid is utilized as the power transmitting means, fluid propelling means adapted to be driven by the power unit of the automobile, fluid propelled means for driving the automobile operatively connected to the fluid propelling means, a valve between the fluid propelling and fluid propelled means and movable to direct the course of fluid for forward and reverse driving of the automobile and for coasting or drifting, a fluid reservoir of a greater capacity than that of the driving means, and a valve connected to the fluid reservoir for directing the driving fluid into the reservoir or into the driving means at will.

14. In a variable speed transmission for automobiles, in which transmission fluid is utilized as the power transmitting means, fluid propelling means adapted to be driven by the power unit of the automobile, fluid propelled means for driving the automobile and responsive to the fluid propelling means, a valve structure between the fluid propelling and fluid propelled means and movable for directing the course of fluid to drive the automobile in the forward or reverse direction and for coasting or drifting, a fluid reservoir of a capacity corresponding to that of the fluid propelling means, and a valve movable to direct the driving fluid into the reservoir or into the propelling means at will, the first-named valve having throttling means, for the flow of liquid.

15. In a fluid transmission, in combination, a pair of rotors arranged in intermeshing relation, each of said rotors comprising a substantially cylindrical rotor having diametrically disposed circumferential notches and circumferential blades formed by said notches, said circumferential blades having radial faces, a casing for said pump having fluid inlet and outlet ports on opposite sides of the intermeshing portions of said rotors, fluid pressure operated means adapted to be driven by said pump, means for controlling the admission of fluid to said fluid pressure operated means to vary the speed thereof independently of the pump and separate means for varying the delivery of fluid to the pump.

In testimony that I claim the foregoing as my own I have hereto affixed my signature.

LANIOUS P. ERB.